April 21, 1936.  F. A. ANTON  2,038,259
LATERAL ARM AWNING
Filed Jan. 31, 1934  5 Sheets-Sheet 5
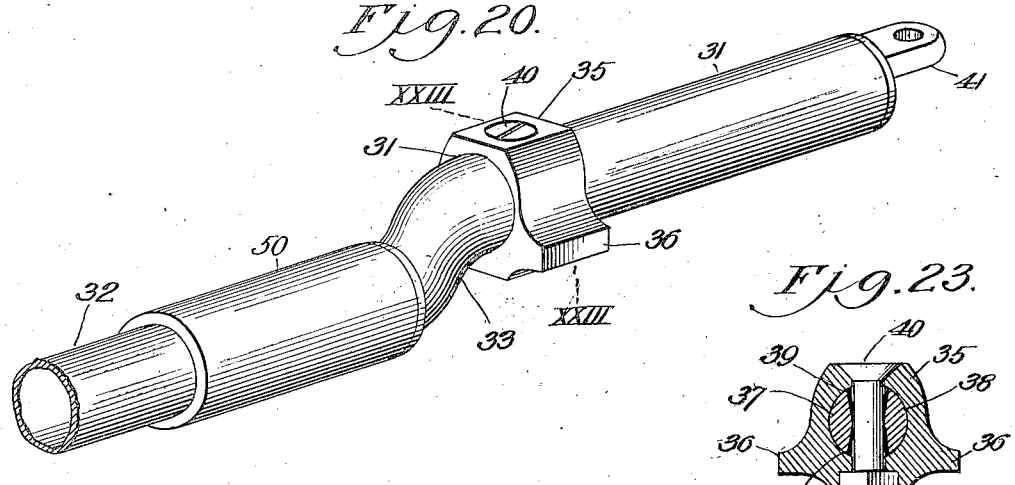
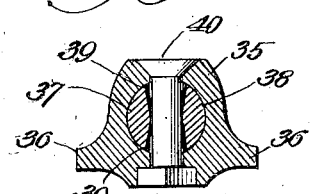
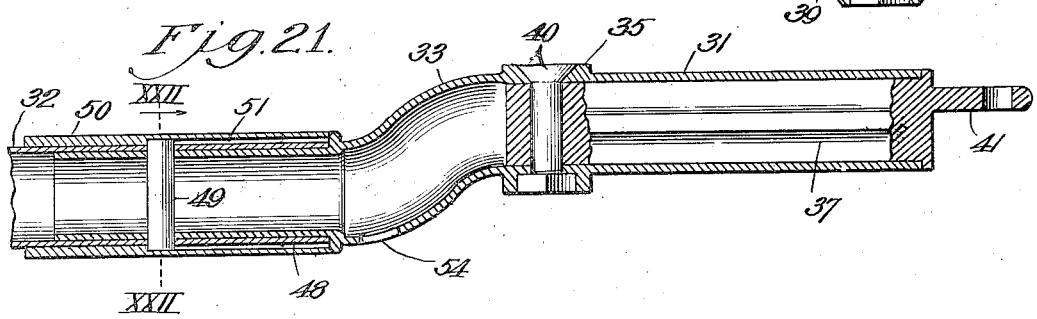
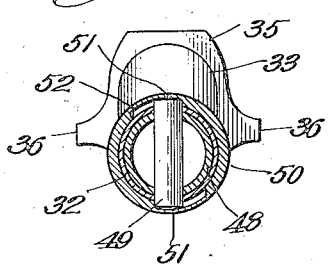
Inventor
Frederick A. Anton
By Thorpe & Thorpe
Attorneys Patented Apr. 21, 1936

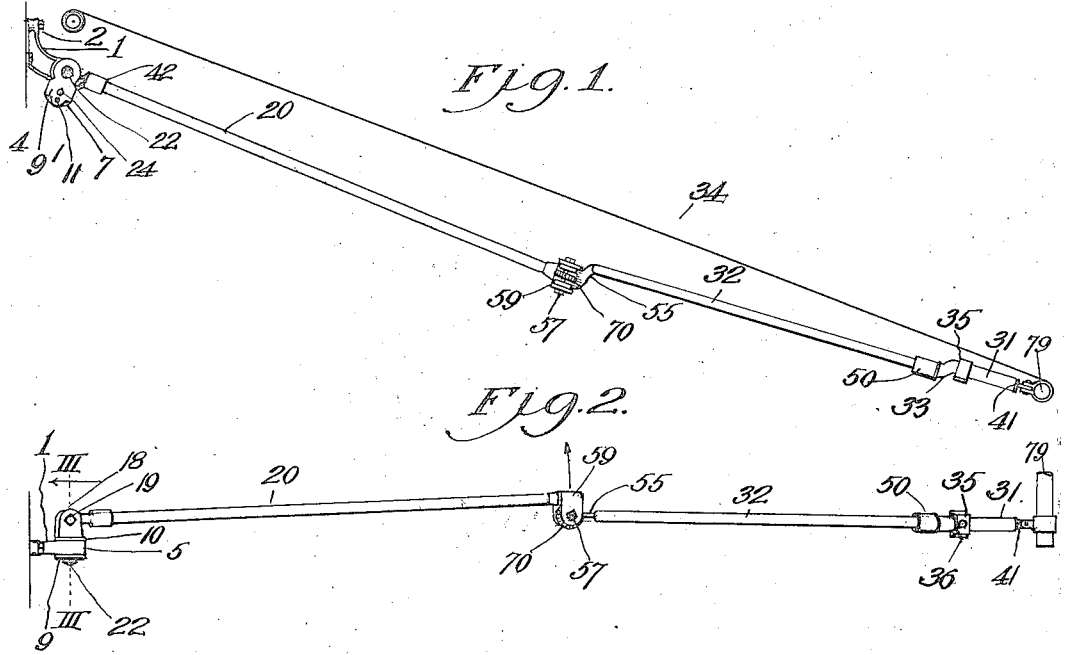
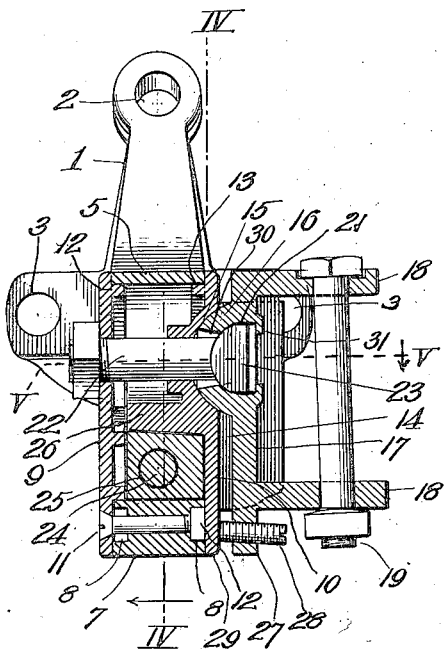
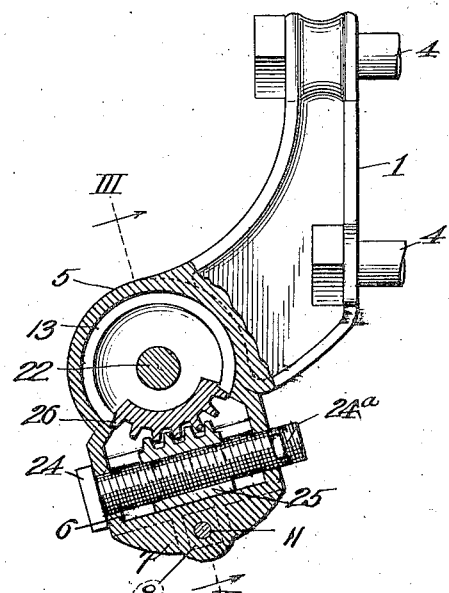

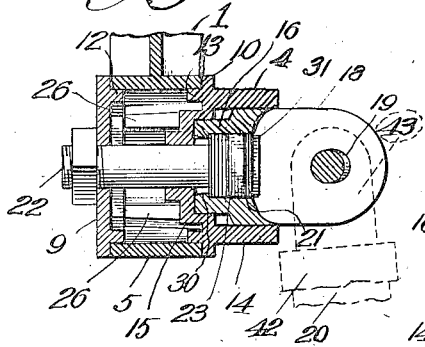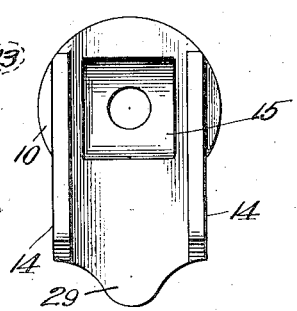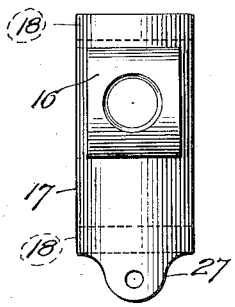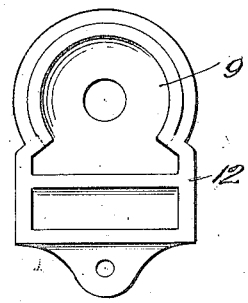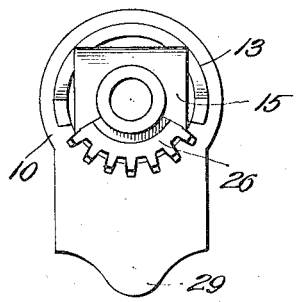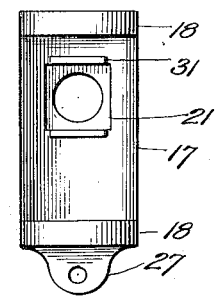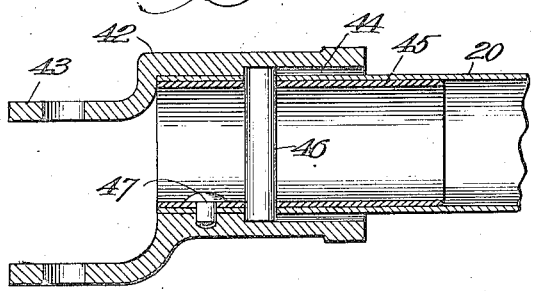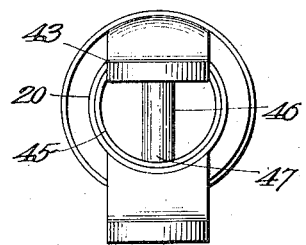

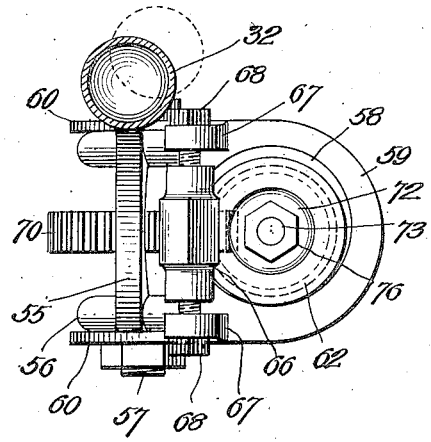
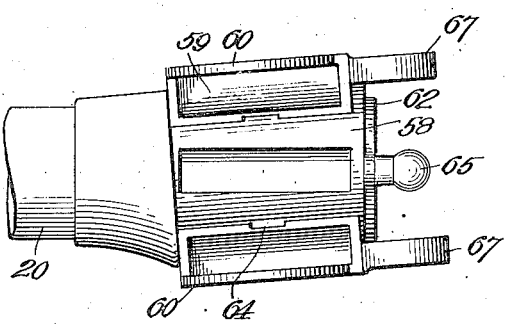
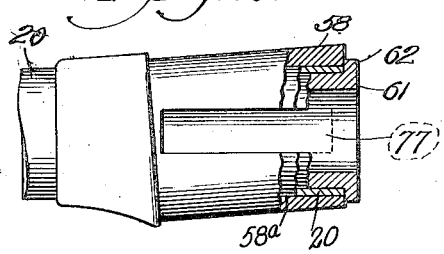

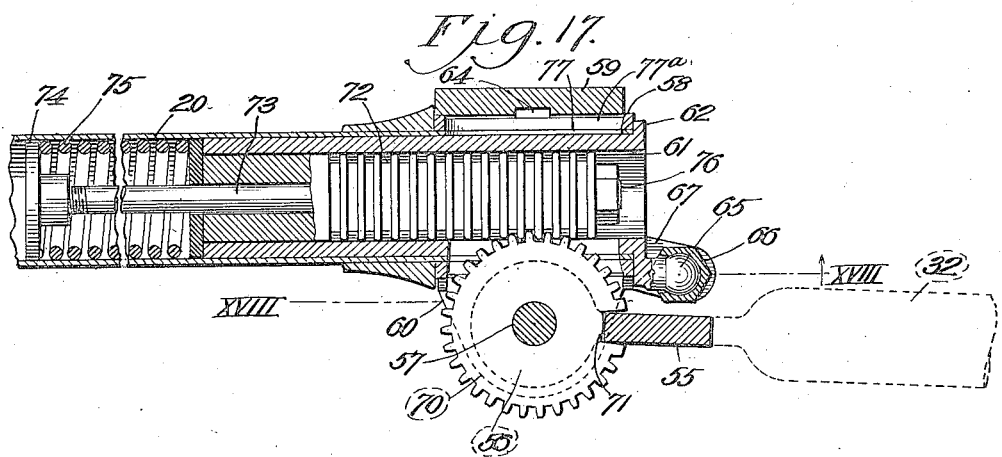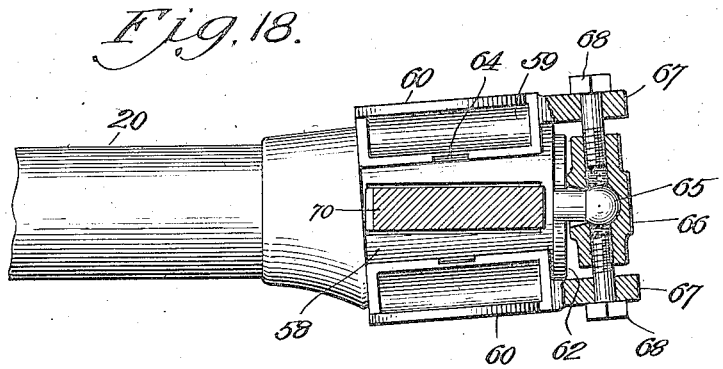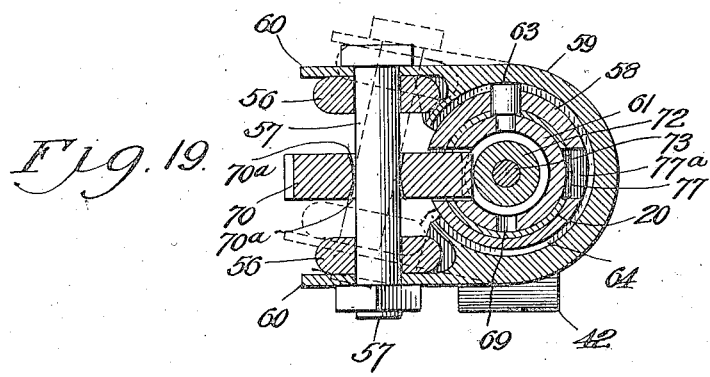

2,038,259

UNITED STATES PATENT OFFICE 2,038,259

LATERAL ARM AWNING

Frederick A. Anton, Topeka, Kans.

Application January 31, 1934, Serial No. 709,112

23 Claims. (Cl. 156—44)

This invention relates to lateral arm awnings and has for its general object to produce an awning arm of such character that the structure may be assembled either as a right or a left arm, and which is provided with numerous compensating adjustments so that the operative characteristics of the awning may be individually established for every part of each lateral arm in accordance with the pitch or inclination of the awning when open, and the space it is to occupy when closed, without necessitating the use of special tools or the bending of the parts of the structure.

All lateral arm awning arms with which I am familiar are constructed with relatively fixed characteristics as regards the space they must occupy when closed, and also as regards the pitch or inclination of the arm when open. This is true because the lateral tilt of the pivots is fixed, the only method of changing such lateral tilt being through the oscillation of the supporting bracket on the front of the building. When the supporting bracket is mounted for oscillation, it is apparent that frictional or clamping pressure of one kind or another, must be relied upon to keep the bracket in adjusted position. Such methods of securing the bracket have never been entirely satisfactory as they frequently work loose and necessitate a service call by the awning company. The mounting of all lateral arm awnings has, therefore, been a compromise, the operator first adjusting the arm to the proper pitch or inclination when open, and then when the arm was swung to folded position, it was usually found to be either too high or too low. To bring such an arm to proper folding position, the bracket and arm as a whole had to be swung or oscillated on the building front, which resulted in changing the pitch when the arm was reopened, and at the same time caused a change in the lateral tilt of the inner, center and outer pivots, so that the awning arm would not function properly. The operator then had to readjust the lateral tilt by again swinging the bracket on the building until a compromise position was reached, it being impossible to get both the pitch, when open, and the position, when folded, at the exact points desired. In many cases the inner half of the arm had to be twisted to change the lateral tilt before the arm would function.

Another object of the invention is to provide an awning arm and parts or fittings therefor, which can be sold in knock-down condition, so that the buyer, instead of having to purchase a plurality of assembled rights and lefts in various lengths, may now carry in stock the finished fittings for connecting the arms together, with a supply of long tubing in finished condition, which he can cut for any desired length and completely assemble in his own plant. Or the buyer can purchase the finished tubing in the desired lengths and avoid the cutting and punching operations as will hereinafter more clearly appear.

The tubing and the connecting parts or fittings may all be finished, such as by being bronzed, painted, lacquered, plated, or the like, and the operation of assembling the arm is such that there is no danger of injury to the finish of the parts. The above advantages in reducing stock and assembly by the buyer, have heretofore been impossible, in view of the fact that the arms must be made of high carbon steel to resist the torsional strains to which they are subjected. This steel is never produced without irregularities and departures from a straight line. Therefore, in the past, arms have had to be assembled by the manufacturer in various lengths. After assembly, a testing and straightening operation had to be performed to insure proper lateral tilt of the pivots so that the arms would properly operate. In this straightening operation the metal had to be bent which produced strain points in the fiber of the metal. The arms were then finished by painting or otherwise.

As pointed out, the general object of this invention is to provide an arm which is adjustable in its various parts after it has been installed, so that the necessity of twisting or bending the parts of the structure to overcome any tendency of the arms to bind during operation, may be entirely obviated. Besides the various advantages above enumerated, the savings of freight rates, storage space, and other advantages are obviously of great importance.

The various advantages above enumerated are accomplished by a combination of fittings giving the following individual advantages, it being possible, however, to use the fittings independently of each other:

1. It is possible for the wall bracket to be permanently and rigidly secured to the building front.

2. The arm is provided with a new positive clutch mechanism in convenient position for the speedy adjustment of the pitch or inclination of the arm when open.

3. The arm is adapted for installation at any heighth, usually the higher the instillation, the greater the pitch.

4. The inner end of the inner arm is provided with means for adjusting the lateral tilt of the inner arm pivot to compensate for changes in height or pitch when open.

5. The fittings are such that the inner arm pivot may be placed either on the right or left of the wall bracket, to make either a right or a left hand arm.

6. The intermediate or center fitting is of such nature that the outer arm may be pivoted to swing to either side of the inner arm, in accordance with whether a right or a left hand arm is to be provided.

7. The intermediate or center fitting is provided with means whereby the lateral tilt of the intermediate pivot may be adjusted independently of the other parts of the structure, to compensate for adjustments in the lateral tilt of the inner pivot.

8. The intermediate or center fitting is provided with eccentric means whereby changes in the lateral tilt of its pivot will raise or lower the outer end of the outer arm so that the fabric shall clear the arm when open, and so that the outer arm shall be in proper position when the awning is closed.

9. The outer end of the outer arm is provided with means for automatically allowing the outer arm pivot to adjust itself laterally, to compensate for adjustments in the center pivot to avoid placing the awning pole under lateral strain which would interfere with the free operation of the structure.

10. Means are provided to connect the tubes, of such nature that the tubes will be reinforced against bending stress and render it feasible to employ tubes for lateral arms.

11. A still further object of the invention is to provide a tubular arm which is ventilated throughout against the internal condensation of moisture which might rust or otherwise damage the awning arm.

With the general objects named in view and others as will hereinafter appear, the invention consists in certain novel and useful features of construction and organization of parts as hereinafter described and claimed; and in order that it may be fully understood, reference is to be had to the accompanying drawings, in which:—

Figure 1 is a side elevation of a lateral arm awning arm embodying the invention.

Figure 2 is a plan view of the construction as shown in Figure 1.

Figure 3 is a section through the wall bracket on the line III—III of Figure 2, on an enlarged scale.

Figure 4 is a section on the line IV—IV of Figure 3.

Figure 5 is a horizontal section on the line V—V of Figure 3.

Figure 6 is an inner face view of the fixed side member of the wall bracket.

Figure 7 is an outer face view of the rotatably-adjustable side member of the wall bracket.

Figure 8 is an inner face view of the rotatably-adjustable side member of the wall bracket.

Figure 9 is an inner face view of a tiltable member carried by the rotatably-adjustable member.

Figure 10 is an outer face view of the tiltable member.

Figure 11 is an enlarged longitudinal section of the inner end of the inner member of the folding arm.

Figure 12 is an inner end view of the inner member of the folding arm.

Figure 13 is a section on the line XIII—XIII of Figure 14.

Figure 14 is an outer side view of the connection for the two members of the folding arm.

Figure 15 is a similar view with the outer arm member and parts of said connections omitted.

Figure 16 is a broken view to more clearly disclose an eccentric rigid with the inner arm member, for determining the rotatable adjustment of the arm member relative to the outer arm member.

Figure 17 is a section on the line XVII—XVII of Figure 14.

Figure 18 is a section on the line XVIII—XVIII of Figure 17.

Figure 19 is a cross section on the line XIX—XIX of Figure 14.

Figure 20 is a perspective view of the outer end of the outer arm.

Figure 21 is a longitudinal section of the construction shown by Figure 20.

Figure 22 is a cross section on the line XXII—XXII of Figure 20.

Figure 23 is a cross section on the line XXIII—XXIII of Figure 20.

In the drawings, where like reference characters identify corresponding parts in all of the figures, 1 indicates a bracket formed with suitable openings 2 and 3 for attachment bolts 4 to a building front. The openings 3 are usually in the form of slots for oscillatory adjustment of the bracket 1 around the opening 2, but in the present invention these openings may snugly receive the securing bolts, as oscillatory adjustment around the opening 2 is unnecessary in the structure of the present invention, as will hereinafter appear. The bracket 1, at its lower end, is formed with a hollow cylindrical transverse head disposed horizontally to provide an opening 5, and below the axis of the head is formed with a portion providing a more or less rectangular shaped opening 6, the bottom wall thereof having a perforated boss 7 formed with end sockets 8. The opposite sides of the bracket head are identical so that the bracket may be used to support either a right or a left hand awning structure as will hereinafter appear.

Adapted to be fitted against either the right or left hand sides of the bracket 1, according to whether a right or a left hand folding arm is to be supported, are a clamping or housing plate 9 and a clutch rack plate 10. The housing plate is held in fixed relation to the bracket 1 by means of a clamp bolt 11 engaged in the boss 7, the plate being maintained against oscillation around the bolt by having an internal rib 12 of such contour as to fit into the circular opening 5 and the rectangular opening 6. The clutch rack plate 10 is adapted for rotation on the face of the bracket and therefore is provided with a circular rib 13 fitted within the opening 5 for the centralization of the plate.

The clutch rack plate is provided with a pair of outstanding side flanges 14, and adjacent its upper end is formed with a perforated socket 15 in the form of a half cylinder. Received between the flanges 14 and having a cylinder-bearing portion 16 for rocking engagement in the socket 15, is a lateral tilt plate 17 provided with ears 18 receiving the pivot pin 19 of the inner end of the inner arm 20. The tilt plate is formed with a cylindrical socket 21 opposite to its bearing 16, and to tie the parts together, a bolt 22 having a cylindrical head 23 fitted in the socket 21, passes through alined openings in the lateral tilt plate 17, the clutch rack plate 10, and the housing plate 9.

The tip or inclination of the inner arm when open, is at relatively right angles to the building, and, when closed, is substantially parallel to the building. This angle is controlled as follows: Journaled in the front and rear walls of the rectangular portion 6, is a bolt 24, having its non-headed end held in position by a cotter pin 24a. The bolt is in threaded engagement with a slide rack block 25, the teeth thereof being at an angle for a purpose which will hereinafter appear. Formed integrally with the inner face of the clutch rack plate 10 is a segmental rack pinion 26 having inclined teeth enmeshed with the teeth of the block 25. It will be evident that by moving the block back and forth, its teeth will cause rotation of the clutch rack plate 10, which, in turn, by means of its projecting flanges 14, will insure a corresponding movement of the plate 17 which carries the pivot bolt 19, to change the pitch of the inner arm. By tightening the bolt 22 it will be evident that the opposite inclines of the rack block and rack will cooperatively clutch or wedge the parts against vibration and accidental movement.

To adjust the lateral tilt or change the position of the pivot bolt 19, relatively parallel to the building front, when the awning is open, and at right angles thereto, when the awning is closed, to insure a better opening movement of the awning (something heretofore accomplished only through oscillatory adjustment of the wall bracket on the building front), the following mechanism may be provided: The lower end of the lateral tilt plate 17 has an extension 27 carrying a set screw 28 which comes into abutment with the face of a corresponding extension 29 on the clutch rack plate 10 (see Figure 3), whereby it is possible to tilt the former in the socket 15, the bearing 26 being cut away as at 30 to accommodate such movement, and the ears 31 holding the bolt 22 in position, providing sufficient play to allow for the adjustment just described.

In practice, it is frequently found that in the adjustment of lateral arms to proper folding position, the lateral tilt of the outer end of the pivot between the outer arm and the front pole or board is altered, which either causes binding of the parts or interferes with the proper positioning of the awning board to close the front end of a transom box. The application, therefore, includes automatic means for compensating to relieve such binding and is shown in Figures 20 to 23 inclusive, in which: 31 is a fitting secured to the outer end of the outer arm 32, by connections hereinafter described, or in any other suitable way. The fitting 31 may have an upward bend 33 if desired, to make sure that the fabric 34 when spread, clears the lateral arms. In the form here shown, said fitting is tubular, and at a point some distance from its outer end, is provided with a generally rectangular-shaped boss 35, formed with a pair of oppositely projecting lugs 36 to act as stops by contact with the front pole to insure the full closing of the lateral arms as will hereinafter appear, one or the other lug so functioning, depending on whether the arm is a right or a left. Fitting within the member 31 is a reinforcing member 37, which is here shown as of cross-shape in section as it has four ribs, three of said ribs appearing in Figure 21, to eliminate friction on the interior of the member 31. The inner end of said member 37 terminates in a head 38 having a passageway 39 oppositely tapered from the opposite sides of the head, to receive a locking bolt 40 carried by the sleeve member 31. The exterior end of the member 37 terminates in a perforated ear 41 for hinged connection to the front pole or board as common in the art. With the construction shown, it will be evident that the front pole or board has a limited rocking movement when the awning is folded and will automatically accommodate itself, regardless of the angle of lateral tilt which may be given to the outer arm, within reasonable limits.

To provide means for interconnecting the tubular arms with their fittings so that all of the connecting parts are concealed, reference is to be had to Figures 11, 12, 21, and 22. In Figures 11 and 12, the inner end pivot of the inner arm 20 is shown as connected to the hinge bracket 42 which is provided with a pair of projecting ears 43 to receive the hinge bolt 19. In order to connect the hinge bracket to the end of the arm with all of the parts concealed and so that the construction may be assembled without tools, the hinge bracket has a tubular end which, is internally formed with a pair of diametrically opposite grooves 44.

Adapted to be received within the tube 20 is a reinforcing sleeve 45 to prevent collapse and to stiffen the member against bending, said tube and arm being provided with registering openings to receive a locking pin 46 which projects beyond the tube 20 and fits in the slots 44. After the bracket has been fitted to the end of the arm with the ends of the pin 46 in the offset or bayonet ends of the slots 44 to hold the arm against pulling out of the bracket, a locking pin 47 is inserted through alined openings in the sleeve 45 and the tube 20, into a socket in the bracket 42. This pin 47 holds the arm and sleeve against rotation to lock the ends of the pin 46 so that it cannot slip from the bracket.

A somewhat similar construction is shown in Figures 21 and 22. In this case, the outer fitting 31 is formed with a tubular portion 48 which is snugly received within the end of the outer arm 32. The two members are provided with registering openings to receive a locking pin 49. In order to hold the locking pin 49 against falling from position and to avoid the use of nuts or the like, a cover sleeve 50, having a pair of oppositely alined grooves 51 with bayonet slot end portions 52, is now slid down on the arm 32, and engages the projecting ends of the pin 49. The sleeve 50 is locked in position by engagement of the bayonet portions of said grooves with the opposite ends of said pin 49. To allow air to circulate through the arm, the bend 33 of the fitting 31 is formed with an opening 54 whereby any moisture which may condense in the tubular arm 32 may flow out.

In lateral arm awning construction, it is necessary that the inner end pivot 19 and intermediate pivot 57 shall have a lateral tilt in reverse directions. To produce an arm which is of universal character and which may be assembled either as a right or a left, the inner and outer arm members must be provided with a fitting whereby the inner end of the outer arm can be pivoted on either the right or the left hand side of the outer end of the inner arm, and such fitting must provide means to receive the pivot bolt 57 at the proper lateral angle for operation of the structure.

One method of providing such a construction is illustrated in Figures 13 to 19 inclusive, in which: The inner end of the outer arm 32, as mentioned, is equipped in any suitable way with the customary fitting 55 having a pair of spaced ears 56 which are pivoted on the pivot bolt 57 carried by the outer end of the inner arm by means hereinafter described.

In order to provide for laterally tilting the outer arm independently of the inner arm, to throw the outer end of the former up or down, a cylindrical member 58 is formed with a bore or passageway 58a (see Figure 16), extending at an angle to the axis of the cylinder, said cylindrical bore being of such diameter as to snugly fit over the outer end of the inner arm. When the member 58 is in such position, it forms an eccentric on the end of the inner arm 20 (see Figure 16). Rotatably mounted on said eccentric 58 is a U-shaped clip 59 which is provided with a pair of ears 60 carrying the pivot bolt 57. It will be evident that rotation of the member 59 on the member 58 will change the lateral tilt of the bolt 57 and will give an eccentric motion to the outer end of the outer arm 32 to change its horizontal plane. To lock the parts in position and to provide means for making the adjustment recited, a reinforcing sleeve 61, having an end flange 62 fitted against the end of the arm 20, is slipped into the outer end of said arm until its flange abuts the end of the arm as described. The clip 59, reinforce sleeve 61, and eccentric 58, are locked together on the end of the tubular arm 20 by means of a pin 63 (Figure 19) fitted in registering openings in said members 58, 61 and 20. The head of the pin 63 is received within an internal groove 64 in the clip 59 to permit the clip to be rotated on the eccentric 58 without any danger of its slipping from position, and in order to permit removing of the pin when it is desired to change the arm from a left to a right, or vice versa.

To provide means for adjusting the member 59, the flange 62 of the reinforce sleeve 61 is provided with a ball member 65, which is received within a socket in an adjustable block 66. The member 59 is provided with a second pair of ears 67 which carry a pair of bolts 68 threaded into alined openings in the opposite ends of the block 66. As the member 61 is held against rotation by the pin 63, it will be evident that by manipulation of the bolts 68 the lateral tilt of the pivot 57 and the horizontal plane of the outer end of the outer arm 32 may be adjusted at will, when the awning is open or closed.

When it is desired to assemble the lateral arm to fold in the direction opposite to that in which it is illustrated, the outer arm 32 is disconnected by removal of the bolt 57, and the member 59 is rotated until the pin 63 can be removed. The inner sleeve 61 is then rotated through an arc of 180° to bring the pin opening 69 in alinement with the openings in the eccentric 58 and the tube 20, and then the pin 63 is reinserted to lock the parts in the new position. The member 59 is now rotated 180° and the parts will be found to occupy their proper relative positions, but on the opposite side of the longitudinal axis of the inner arm.

In view of the fact that lateral arm awnings as applied to modern store fronts, usually require but a slight angle of downward inclination, it is found desirable to provide resilient means for opening or spreading the fabric and keeping same in taut condition. In the present construction, the apparatus for accomplishing this result comprises a gear 70 pivoted on the bolt 57, the bolt-receiving opening being flared at both ends, as shown at 70a to allow for lateral tilting of the bolt (see the dotted lines in Figure 19). The gear 70 is rotated by movements of the outer arm through engagement of a notch 71 in the gear 70 with the adjacent edge of the fitting 55. The gear 70 lies between the planes of the ears 60 of the clip 59 and passes through registering openings in the eccentric 58, the inner arm 20, and the internal reinforce sleeve 61, and is enmeshed with a rack bar 72 of cylindrical form so that the parts will always mesh regardless of their relative positions.

The rack bar 72 has an internal passageway receiving a bolt 73, which projects for some distance into the inner arm 20. The inner end of the bolt 73 carries an abutment head 74, and inserted between said head and the inner end of the sleeve 61, is an expansion spring 75. The opposite or outer end of the rod 73 carries an adjusting nut 76 for tensioning the spring 75. To accommodate the gear 70 on the opposite side of the longitudinal axis of the arm 20, said arm and its eccentric 58 are provided with an extra set of registering openings 77 and 77a. A second opening is not necessary in the reinforcing member 61, since this member is rotated 180° to properly position the ball 65 and the pivot bolt 57.

In view of the fact that the operation of the parts has been set forth in detail, recapitulation is not necessary. From the above description, it will be apparent that I have produced a construction embodying the advantages set forth as desirable, and while I have described and illustrated the preferred construction, it is to be understood that I reserve the right to all changes within the spirit of the invention and without the ambit of the prior art.

I claim:—

1. A lateral arm for lateral arm awnings comprising a wall bracket, and swingably mounted outer and inner arms, a connection between the inner arm and bracket for adjusting the lateral tilt of the inner arm pivot, and a second connection between the outer and inner arms for adjusting the lateral tilt of the intermediate pivot.

2. A lateral arm for lateral arm awnings comprising a wall bracket, and swingably mounted outer and inner lateral arms, the pivot members of each arm being independently laterally adjustable.

3. A lateral arm for lateral arm awnings comprising a wall bracket, a pivot laterally tiltable on the bracket, an inner arm carried by said pivot, a second pivot laterally tiltable on the outer end of the inner arm, and an outer arm carried by said second pivot.

4. A lateral arm for lateral arm awnings comprising a wall bracket, a pivot laterally tiltable on the bracket, an inner arm carried by said pivot, a second pivot laterally tiltable on the outer end of the inner arm, an outer arm carried by said second pivot, and an awning pole pivotally mounted for lateral tilting with relation to the outer end of the outer arm.

5. The combination in a lateral arm awning, of a support, a lateral arm member pivoted to said support and eccentrically adjustable thereon.

6. The combination in a lateral arm structure, of a support, an eccentric carried by said support, a pivot member mounted for movement on the eccentric, and an awning arm pivotally mounted on said pivot member.

7. In an awning construction, a forwardly-projecting wall bracket, and a bracket supported from the wall bracket and provided with a substantially upright pivot pin, and adapted for rocking adjustment to dispose the pin in a vertical plane or in a laterally inclined relation to the wall bracket.

8. A folding arm comprising an inner and an outer member, an eccentric upon the inner member, a yoke rotatably-adjustable on the eccentric and pivotally connected to the inner end of the outer member, and means connecting the inner member and yoke for adjusting the latter rotatably around the eccentric.

9. A pair of awning arms pivotally connected together, the axis of said pivotal connection being rotatively adjustable around the longitudinal axis of one of said arms.

10. A pair of awning arms pivotally connected together, the axis of said pivotal connection being eccentrically adjustable around the longitudinal axis of one of the arms.

11. An awning arm, an eccentric slidingly fitted on one end of said arm, a yoke rotatably adjustable on the eccentric, and a pin retaining the arm, eccentric and yoke against longitudinal movement relative to each other.

12. An awning arm comprising an arm, an eccentric slidingly fitted to one end of said arm, a yoke rotatably adjustable on the eccentric, a pin holding the eccentric and arm against relative rotation, and holding the eccentric, arm and yoke against relative longitudinal movement, and means for rotatively adjusting the yoke on said eccentric.

13. An awning arm having one end associated with a cylinder having its axis out of alinement with the longitudinal axis of the arm, a yoke rotatably adjustable on said cylinder, and a second awning arm pivotally connected to said yoke.

14. An awning arm having one end associated with a cylinder having its axis out of alinement with the longitudinal axis of the arm, a yoke rotatably adjustable on said cylinder, a second awning arm pivotally connected to said yoke, and means associated with the first arm and yoke for adjustably positioning and locking said yoke on the cylinder.

15. In an awning construction, a forwardly projecting wall bracket, an arm bracket rotatively supported on and to one side of said wall bracket and provided with a substantially upright pivotal pin, and means imposing pressure in opposite directions on the wall bracket and on the arm bracket to move the latter to adjust the angle of the axis of the pivotal pin independent of the rotative adjustment of the arm bracket on the wall bracket.

16. The combination in a lateral arm for awnings comprising a pair of arm sections, a yoke carried by and rotatable on one of said arm sections, and one end of the other arm section being pivotally connected to said yoke.

17. In a lateral arm for awnings comprising relatively movable arm sections, a yoke rotatably mounted at an end of one arm section, a sleeve fixed to said arm section, and means operative against the sleeve for effecting rotative adjustment of the yoke.

18. In a lateral arm for awnings comprising relatively movable arm sections, a yoke rotatably mounted at an end of one arm section and having a pair of projecting ears, a sleeve fixed to said arm section, an abutment portion on the sleeve, and means operatively engaging the yoke ears and sleeve abutment for rotatably adjusting said yoke.

19. In a lateral arm for awnings comprising relatively movable arm sections, a yoke rotatably mounted at an end of one arm section having two pairs of projecting ears, a sleeve fixed to said arm section, an abutment portion on said sleeve, means operatively engaging one pair of yoke ears and the sleeve abutment for rotatably adjusting the yoke, and means pivotally connecting said other pair of yoke ears to the other arm section.

20. In a lateral arm for awnings comprising two arm sections, a yoke having a pair of laterally projecting ears connected to one arm section, means adjustably mounting said yoke on said other arm section so that the yoke may be positioned with said projecting ears to either side of said other arm section, and means for locking the yoke in adjusted position.

21. In a lateral arm for awnings comprising two arm sections, a yoke mounted for rotatable adjustment at an end of one arm section, a sleeve rotatably carried by said arm section, means locking said sleeve and arm section in desired rotative relationship, and means engaging said sleeve and connected to said yoke for effecting rotative adjustment of the yoke.

22. In a lateral arm for awnings comprising two arm sections, a yoke rotatably mounted at an end of one arm section and adapted to pivotally support the other arm section, a sleeve carried by the first mentioned arm section and formed with an abutment portion projecting to one side of its axis, means to adjustably lock the sleeve to its arm section with its abutment portion to either side of the longitudinal axis of said arm section, and means engaging said abutment portion and connected to said yoke for effecting rotative adjustment of the yoke.

23. In a lateral arm for awnings comprising two arm sections, a yoke rotatably mounted at the end of one arm section and having two pairs of projecting ears, a sleeve carried by the arm and formed with an abutment portion at one side of its axis, means to adjustably lock the sleeve to the arm with its abutment portion to the right or left of the longitudinal axis of the arm, means engaging one pair of yoke ears and said sleeve abutment portion for rotatably adjusting said yoke, and means pivotally connecting said other pair of yoke ears to the other arm section.

FREDERICK A. ANTON.